UNITED STATES PATENT OFFICE.

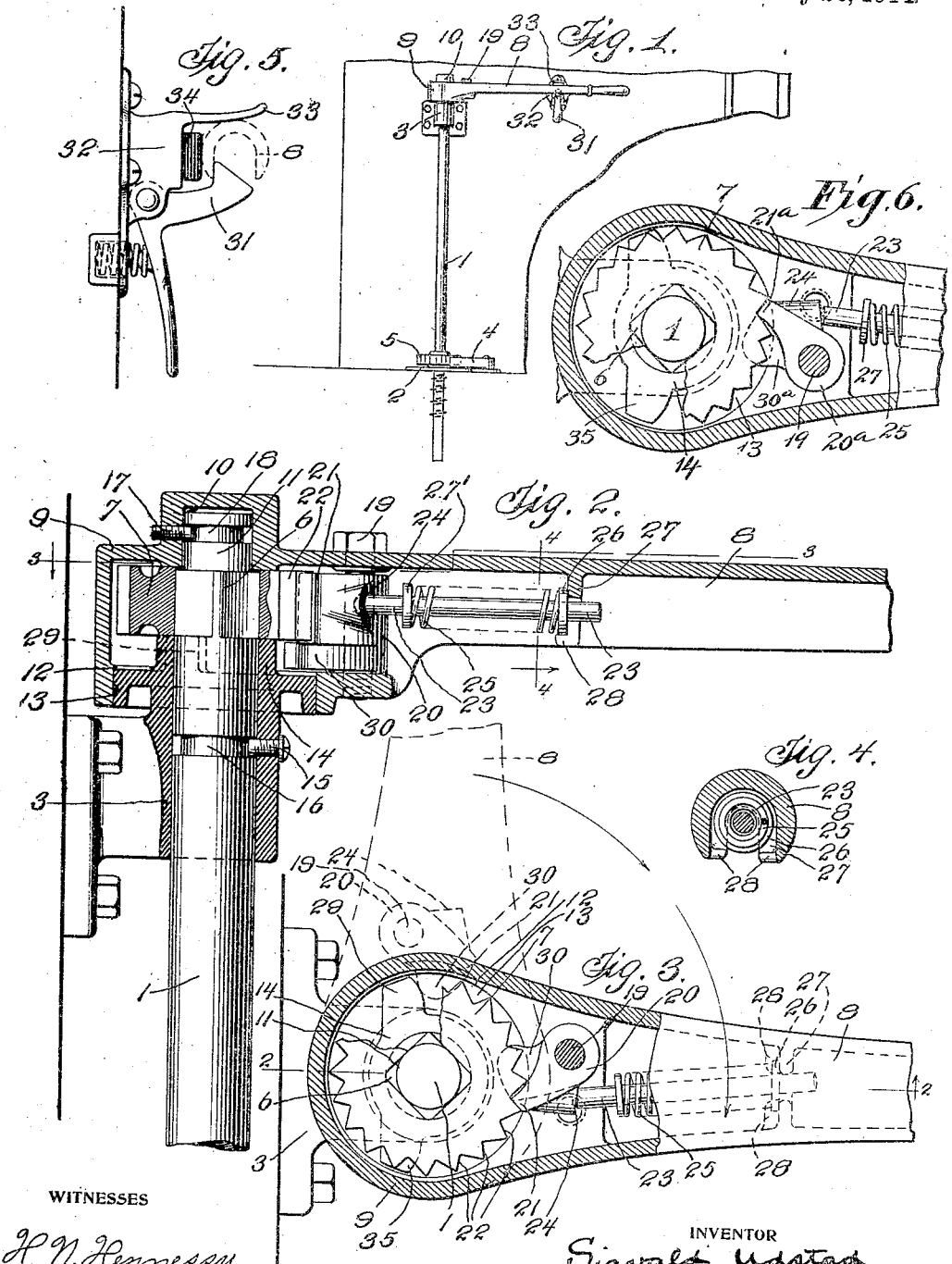

SIGVALD UDSTAD, OF ST. CHARLES, MISSOURI, ASSIGNOR TO AMERICAN CAR AND FOUNDRY COMPANY, OF ST. LOUIS, MISSOURI, A CORPORATION OF NEW JERSEY.

BRAKE-HANDLE.

1,097,952.  Specification of Letters Patent.  Patented May 26, 1914.

Application filed December 2, 1911. Serial No. 663,646.

*To all whom it may concern:*

Be it known that I, SIGVALD UDSTAD, residing at St. Charles, Missouri, and being a citizen of the United States, have invented certain new and useful Improvements in Brake-Handles, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is an elevational view of a brake shaft provided with an operating handle constructed in accordance with this invention, said brake shaft being fixed to parts of a car body. Fig. 2 is a greatly enlarged vertical sectional view, said section being taken substantially on the plane of line 2—2 of Fig. 3, parts being shown in full. Fig. 3 is a horizontal sectional view taken substantially on the plane of line 3—3 of Fig. 2, parts being broken away for the purpose of better disclosing the construction and operation of parts of the device which otherwise would be concealed from view. Fig. 4 is a transverse detail sectional view taken on the plane of line 4—4 of Fig. 2, and, Fig. 5 is an enlarged detail elevational view of the latch mechanism designed for retaining the operating handle in normal position of rest. Fig. 6 is a detail view showing the device illustrating the pawl constructed to drive in a direction opposite to the drive of the parts as shown in Fig. 2.

The object of this invention is to provide an automatically operating release for the brake shaft of railroad cars.

It is old to provide a single radial arm or operating handle on a brake shaft, connected to said shaft by pawl and ratchet mechanism, and the pawl being adapted to be removed from engagement with the ratchet by a separately formed hand lever adapted to disengage the handle mechanism from the shaft so that the shaft may be free to rotate without swinging the brake handle. Such a construction, however, appears cumbersome and complicated, and the hand grip thereof is subject to operation at times when such operation is not desired.

It is a further and more specific object of the invention illustrated herewith, to simplify the construction and reduce the cost of manufacture of brake handles of this class, and to so construct the same as to effectually provide against unintentional release of the handle from the shaft.

The structure illustrated provides a pawl and ratchet mechanism, the ratchet being fixed to the shaft and the pawl being carried by the handle and being adapted to be automatically disengaged from the ratchet when the handle is swung into normal position of rest, all of said mechanism being contained and concealed within the handle and requiring no separately formed lever or hand grip.

Referring to the drawings, the numeral 1 indicates the brake shaft which is mounted in suitable bearings 2 and 3 fixed by means of brackets to any convenient part of the car body. The bearing 2 engages the shaft adjacent the floor of the car, and the tubular bearing 3 engages the shaft near its upper end. The usual foot operated pawl 4 is provided for engaging a ratchet 5 fixed to the shaft 1 at the floor adjacent the bearing 2. Above the bearing 3 the shaft 1 is squared as at 6 and is fitted with a ratchet wheel 7.

The operating handle as 8 is formed with an enlarged hub portion, said hub portion comprising a shell or casing 9 adapted to receive and cover the upper end of the shaft and the ratchet wheel 7. The casing 9 has a bearing 10 formed in its upper horizontal wall adapted to receive the upper turned end 11 of the shaft 1, above the squared portion 6. The lower wall of the casing is cut away to form a bearing 12 concentric with the bearing 10, but of larger diameter and adapted to fit snugly over a bearing portion 13 formed upon an extension 14 upstanding from the bearing 3. The bearing 12 is made of sufficient diameter to permit passage of the ratchet 7 therethrough in assembling or separating the parts.

A suitable locking screw or its equivalent as 15 extends through the wall of the bearing 3 into engagement with an annular groove 16, formed in the shaft 1 for retaining the shaft against endwise movement in said bearing. A similar locking screw as 17 extends through the wall of the bearing 10 into an annular groove 18, formed in the upper end 11 of the shaft 1, for retaining the handle against disconnection from the upper end of the shaft.

Mounted upon a pivot 19 extending vertically through the casing 9 is a pawl 20 having its free end 21 disposed for engaging the teeth 22 of the ratchet 7. A spring pressed rod 23 has one of its ends engaging in a suitable pocket 24 formed upon the outer face of the pawl 20. The spring 25 as for said rod surrounds the rod and has one of its ends resting against a washer 26 which in turn rests against a web 27 formed in the handle 8, and its other end contacting with a collar 27' on the rod 23 adjacent the pawl 20. The pressure of said spring against the collar 27' serves to force the rod yieldingly against the pawl for pressing said pawl constantly toward the ratchet 7.

The handle 8 is substantially U-shape in cross section having its open side disposed downwardly, and the rib 27 follows the shape of the interior of the handle, leaving a sufficient opening for the passage of the end of the rod 23 therethrough; and suitable shoulders as 28—28 are formed upon the opposite ends of said rib 27 for maintaining the washer 26 against displacement.

Formed upon the extension 14 of the bearing 3, above the bearing portion 13 and within the hollow of the casing 9, is a fixed lateral finger or stop 29. The pawl 20 is formed with a shoulder or extension 30 so disposed with relation to the stop 29 as to contact with said stop when the lever or handle 8 is moved or rotated into its normal position of rest for lifting the free or ratchet engaging end 21 of the pawl 20 positively from engagement with, and out of the path of, the teeth of the ratchet 7.

A retaining latch 31 carried on a suitable base 32 fixed to a convenient portion of the car structure is disposed for engaging one of the legs of the U-shaped handle 8, see Fig. 5, near the outer end thereof for retaining said handle in its normal position. The base 32 is formed with an extension 33 adapted to guide the lever 8 into latching position and said base carries a cushion or bumper as 34 against which the handle is adapted to impinge.

With the structure disclosed it is apparent that by disengaging the latch 31 from the handle or lever 8, said lever may be swung in the direction indicated by the arrows in Fig. 3, from the position shown by dotted lines in said figure, to and beyond the position shown by full lines therein. During the initial movement of said lever the extension 30 of the pawl 20 will ride along the face of the fixed finger or stop 29 and the end 21 of the pawl will engage the first available tooth of the ratchet 7. Further movement of the lever will rotate the ratchet, and with it the shaft 1, for tightening the brakes. If one oscillation is insufficient the foot pawl and ratchet mechanism is operated to maintain the shaft in its partly rotated position and the lever 8 is returned to or near its original position and again oscillated. When the brakes are finally set the shaft may be retained by the foot pawl 4 and the lever 8 may be returned to its normal position and allowed to remain until again required for setting the brakes. When the brake handle is in its normal position, the operation of releasing the brakes does not effect the position of the lever. To release the brakes the foot pawl 4 is disengaged from the ratchet 5 and the shaft 1 will rotate freely, the teeth of ratchet 7 passing clear of the pawl 20. From this disclosure it is obviously within the skill of the mechanic to rearrange the parts so that the pawl and ratchet will operate in the opposite direction from that shown in the illustration, and in the drawing a stop 35 has been shown corresponding in function to the stop 29.

Fig. 6 is a detail view showing the parts arranged to drive the shaft 1 in a direction opposite from the direction of drive as illustrated in Figs. 1, 2 and 3. To accomplish the reversal of the drive it is necessary that a pawl 20ª including a shoulder 30ª be substituted in the place of the pawl 20 having the shoulder 30, illustrated in Figs. 1, 2 and 3. By the mere substitution of the pawl member the parts are capable of being assembled to drive the shaft 1 in either direction as may be required by circumstances.

While the invention is herein shown and described as being adapted to a vertically disposed brake shaft projecting downwardly through the floor of the car platform it will be understood that the same is equally applicable to a horizontally or otherwise disposed brake shaft.

What I claim is:—

1. In a device of the class described, the combination comprising a brake shaft with non-circular portion near its upper end, a ratchet on said non-circular portion, a brake handle-lever formed with a hollow casing inclosing said ratchet, a pivot pin in said head portion, a pawl with an extension thereon on said pivot, a spring actuated rod adapted to bear at all times on said pawl and a fixed release extending laterally beyond said shaft adapted to bear on said extension of the pawl to automatically release such pawl when the parts occupy a predetermined position.

2. In a brake mechanism, a tubular bearing, a brake shaft journaled in said bearing, a ratchet mounted on said shaft and supported by said bearing, a bearing portion concentric with said bearing below said ratchet and of a diameter substantially equal to that of said ratchet, a brake handle having a hollow hub with an internal diameter substantially equal to the diameter of the bearing portion, capping said shaft and centered by and inclosing said bearing portion, and means carried by the handle adapted to feed said ratchet in one direction.

3. In a brake mechanism, a tubular bearing, a brake shaft journaled in said bearing, a ratchet mounted on said shaft and resting on said bearing, a bearing portion concentric with said bearing below said ratchet, a brake handle having a hub capping said shaft and centered by and inclosing said bearing portion, a pawl carried by the handle adapted to feed said ratchet in one direction, a stop projecting from said bearing within said hub and in the path of said pawl adapted to be engaged by said pawl, thereby to disengage the same from said ratchet.

4. In a brake mechanism, a bearing, a shaft journaled in said bearing, a ratchet mounted on said shaft and resting on said bearing, a brake handle having a hub capping said shaft and ratchet and engaging said bearing thereby to center the same on said shaft, and a pawl pivoted within said handle and adapted to engage said ratchet.

5. In a brake mechanism, a brake shaft, a ratchet mounted on said shaft, a brake handle having an integral hub capping said shaft and containing said ratchet, a pivot pin on said handle, a pawl pivoted to said pin and adapted to engage said ratchet, a rod projecting from said pawl to one side of said pin, and a spring guided by and engaging said rod and adapted to maintain said pawl in engagement with said ratchet.

6. In a brake mechanism, the combination with two superimposed members, of a brake shaft disposed centrally in each of said members, the upper of said members being a ratchet and the other member a bearing having a stop projecting therefrom beneath said ratchet, a brake handle capping said shaft and engaging said bearing, a pawl pivoted to said handle and adapted to engage said ratchet to actuate the same, and an inclosed projection from said pawl extending below the ratchet adapted to be engaged by said stop to disconnect said pawl from said ratchet.

7. In a brake mechanism, a tubular bearing, a shaft mounted in said bearing, a ratchet wheel mounted on said shaft and resting on said bearing, a handle capping said shaft, a pawl pivoted in the handle and adapted to feed the ratchet when said handle is actuated, a stop projecting radially from said bearing and adapted to automatically disengage said pawl from the ratchet wheel when the said handle is in a predetermined position.

8. In a brake mechanism, a tubular bearing, a brake shaft mounted in said bearing, a ratchet wheel mounted on said shaft, a brake handle having a portion inclosing said ratchet wheel, a bearing member below said ratchet wheel and adapted to center said brake handle, a pivoted pawl carried by the handle for feeding the ratchet wheel, and a laterally projecting stationary lug for automatically disengaging the pawl from the ratchet wheel at a predetermined position of the brake handle.

9. A brake mechanism comprising a bearing, a shaft journaled in said bearing, a ratchet wheel mounted on said shaft, a brake handle substantially U-shaped in cross section and having a cup-shaped end adapted to inclose said ratchet wheel, a pawl pivoted on said handle and projecting within the cup-shaped portion, an abutment on the inner face of said handle, and a spring pressed rod intermediate said pawl and said abutment.

10. In a device of the class described in combination, a tubular bearing member, a collar carried by said member and forming a bearing portion concentric with said tubular member, a ratchet wheel resting on said tubular member above said collar, a brake handle having a hollow end inclosing the ratchet wheel and engaging said bearing collar, a pivoted pawl carried by the handle and adapted to feed the ratchet wheel, means comprising a spring pressed rod for holding the pawl in working engagement with the ratchet wheel, and a lug for automatically disengaging the pawl from the ratchet wheel when the handle is moved to a predetermined position.

11. A brake mechanism including in combination, a brake shaft, a bearing for said shaft, a ratchet wheel carried by said shaft, a handle, a collar carried by said bearing, said collar forming a bearing for the handle, a pawl pivoted in said handle and coöperative with the ratchet wheel, and a lug located between the bearing collar and the ratchet wheel, said lug coöperating with a portion of said pawl to disengage the pawl from the ratchet wheel when the handle is moving to a predetermined position.

12. A brake mechanism including in combination, a brake shaft, a ratchet wheel upon the brake shaft, a handle, a bearing for said handle, a pawl carried by the handle and coöperative with the ratchet wheel, and a lug located between said bearing and said ratchet wheel, said lug being in the path of a portion of said pawl when said handle is operated through a predetermined arc.

In witness whereof I have hereunto set my hand in the presence of two witnesses.

SIGVALD UDSTAD.

Witnesses:
JAMES J. COOPER,
OSCAR HOCHBERG.